United States Patent
Muto et al.

(10) Patent No.: US 9,919,729 B2
(45) Date of Patent: Mar. 20, 2018

(54) POWER STEERING SYSTEM

(71) Applicant: HITACHI AUTOMOTIVE SYSTEMS STEERING, LTD., Hiki-gun, Saitama (JP)

(72) Inventors: Satoru Muto, Novi, MI (US); Keisuke Kitamura, Atsugi (JP); Tatsuyoshi Maruyama, Atsugi (JP)

(73) Assignee: HITACHI AUTOMOTIVE SYSTEMS STEERING, LTD., Saitama (JP)

( * ) Notice: Subject to any disclaimer, the term of this patent is extended or adjusted under 35 U.S.C. 154(b) by 25 days.

(21) Appl. No.: 14/914,144

(22) PCT Filed: Jul. 29, 2014

(86) PCT No.: PCT/JP2014/069886
§ 371 (c)(1),
(2) Date: Feb. 24, 2016

(87) PCT Pub. No.: WO2015/029672
PCT Pub. Date: Mar. 5, 2015

(65) Prior Publication Data
US 2016/0207560 A1    Jul. 21, 2016

(30) Foreign Application Priority Data
Aug. 30, 2013   (JP) ................... 2013-178903

(51) Int. Cl.
*B62D 5/04* (2006.01)
*B62D 3/08* (2006.01)
(Continued)

(52) U.S. Cl.
CPC ............... *B62D 3/08* (2013.01); *B62D 5/04* (2013.01); *B62D 5/0403* (2013.01);
(Continued)

(58) Field of Classification Search
CPC .......... B62D 3/08; B62D 5/04; B62D 5/0403; B62D 5/0424; B62D 5/0448
(Continued)

(56) References Cited

U.S. PATENT DOCUMENTS 5,437,349 A    8/1995   Kurahashi et al.
2001/0053255 A1  12/2001  Obara
(Continued)

FOREIGN PATENT DOCUMENTS

DE   10 2009 000 575 A1   8/2010
JP      S54-053225 A      4/1979
(Continued)

*Primary Examiner* — Tony H Winner
(74) *Attorney, Agent, or Firm* — Foley & Lardner LLP

(57) ABSTRACT

A power steering system is provided with a communicating hole and yet ensures the strength of a housing. Space between the housing and a wheel turning shaft is divided into two. Space located on one axial side of the bearing supporting a nut and the plurality of balls disposed in the nut is a first chamber, and space located on the other side is a second chamber. The communicating hole allowing communication between the first and second chambers is formed in the nut to open in the nut-side ball screw groove, avoiding a region in which the balls circulate, or in a member disposed radially further outside than the nut and radially inside than the inner wall of the housing.

14 Claims, 17 Drawing Sheets

(51) Int. Cl.
   *F16H 25/22*    (2006.01)
   *F16H 25/24*    (2006.01)

(52) U.S. Cl.
   CPC ......... *B62D 5/0424* (2013.01); *B62D 5/0448* (2013.01); *F16H 25/22* (2013.01); *F16H 25/2204* (2013.01); *F16H 25/24* (2013.01)

(58) Field of Classification Search
   USPC ......................................................... 180/444
   See application file for complete search history.

(56) References Cited

U.S. PATENT DOCUMENTS

| | | | | |
|---|---|---|---|---|
| 2003/0000766 | A1* | 1/2003 | Tatewaki | B62D 5/0424 180/444 |
| 2004/0016312 | A1* | 1/2004 | Yabe | F16C 29/06 74/89.4 |
| 2009/0294203 | A1* | 12/2009 | Okada | B62D 5/0448 180/444 |
| 2013/0220728 | A1* | 8/2013 | Lee | B62D 5/0448 180/444 |

FOREIGN PATENT DOCUMENTS

| | | |
|---|---|---|
| JP | 06-255503 A | 9/1994 |
| JP | 09-264324 A | 10/1997 |
| JP | 10-278811 A | 10/1998 |
| JP | 11-051069 A | 2/1999 |
| JP | 2002-372119 A | 12/2002 |
| JP | 2003-343686 A | 12/2003 |
| JP | 2005-304252 A | 10/2005 |
| JP | 2006-224896 A | 8/2006 |

* cited by examiner

A-A

F-F

POWER STEERING SYSTEM

TECHNICAL FIELD

The invention relates to a power steering system.

BACKGROUND ART

One of the technologies of this kind is disclosed in the Patent Document 1 below. The Patent Document 1 discloses a technology of forming a communicating hole in a housing so that the hole allows air in two spaces, across a ball-nut screw mechanism from each other, to pass back and forth.

CITATION LIST

Patent Document

Patent Document 1: DE102009000575

SUMMARY OF INVENTION

Technical Problem

The technology disclosed in the Patent Document 1 has the problem that the communicating hole formed in the housing deteriorates the strength of the housing.

The present invention has been made in light of this problem. An object of the invention is therefore to provide a power steering system which is provided with a communicating hole and yet ensures the strength of the housing.

Solution to Problem

To achieve the object, according to a power steering system of the invention, space between a housing and a wheel turning shaft is divided into two including a first chamber which is a space located on one axial side of a bearing supporting a nut and a plurality of balls disposed in the nut and a second chamber which is a space located on the other axial side. A communicating hole is formed in the nut to open in a nut-side ball screw groove, avoiding a region in which the plurality of balls circulate, or in a member disposed radially further outside than the nut and radially further inside than an inner wall of the housing. The communicating hole communicates the first chamber with the second chambers.

Advantageous Effect of Invention

Thus provided is the power steering system which is provided with the communicating hole and yet ensures the strength of the housing.

BRIEF DESCRIPTIONS OF DRAWINGS

DESCRIPTION OF PREFERRED EMBODIMENTS

[Embodiment 1]

A power steering system 1 according to an Embodiment 1 will be now described. The power steering system 1 of the Embodiment 1 transmits a driving force of an electric motor 40 through a screw mechanism 26 to a wheel turning shaft 10 and thus imparts an assisting force to a driver's steering force.

[Configuration of the Power Steering System]

Figure 1:
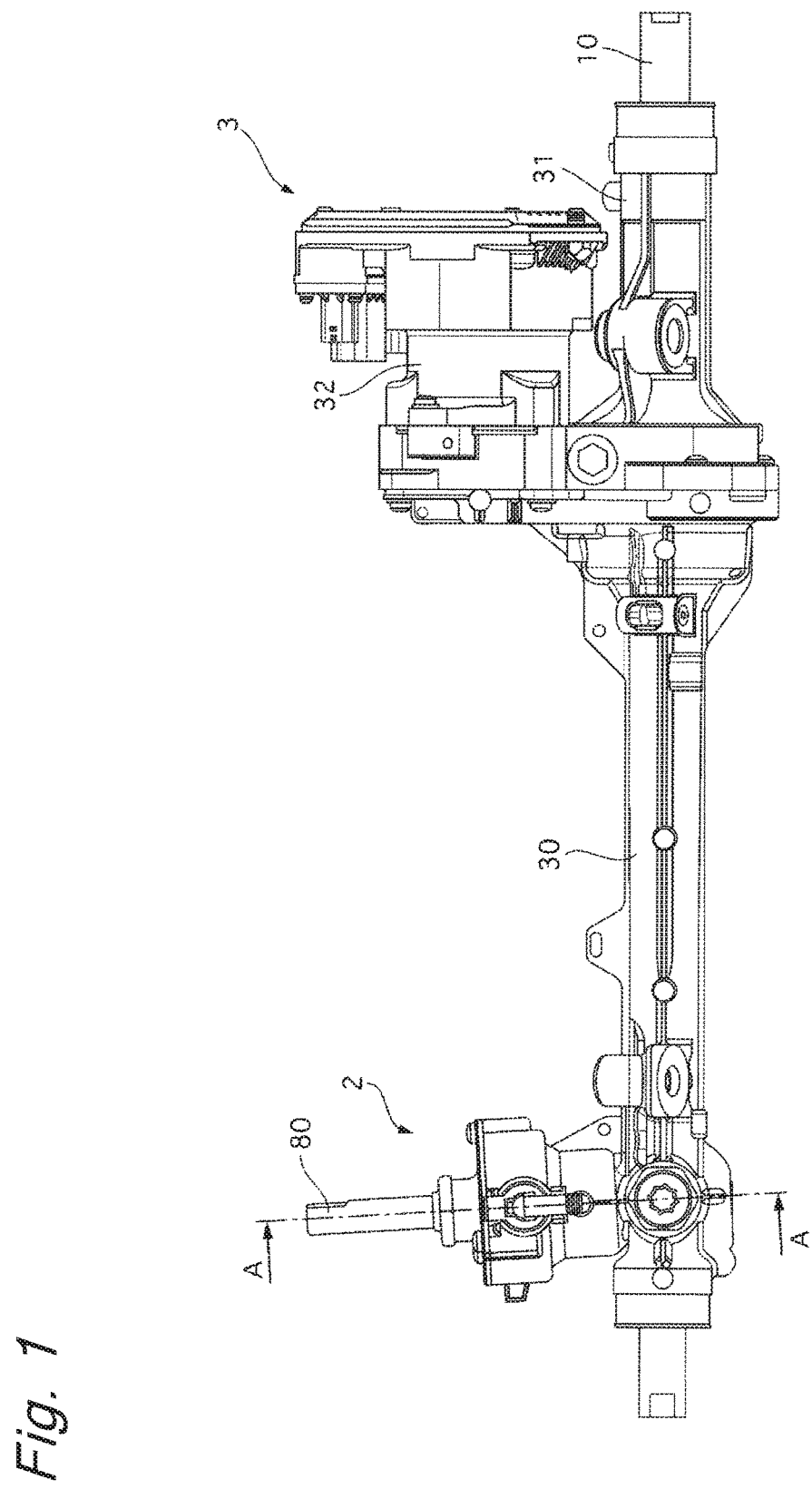
FIG. 1 is a front view of a power steering system of an Embodiment 1.
Figure 2:
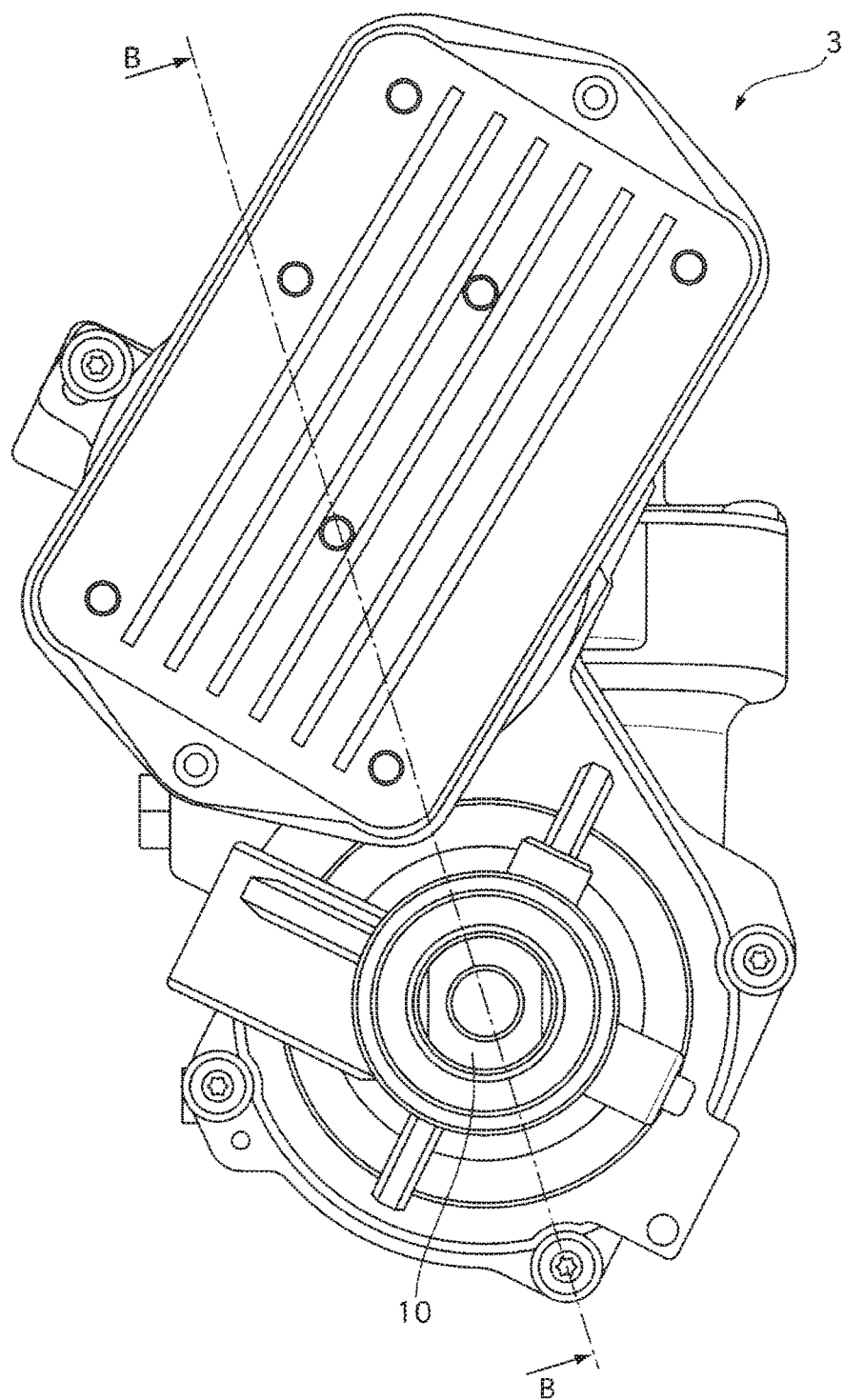
FIG. 2 shows the power steering system of the Embodiment 1, viewed in an axial direction.
Figure 3:
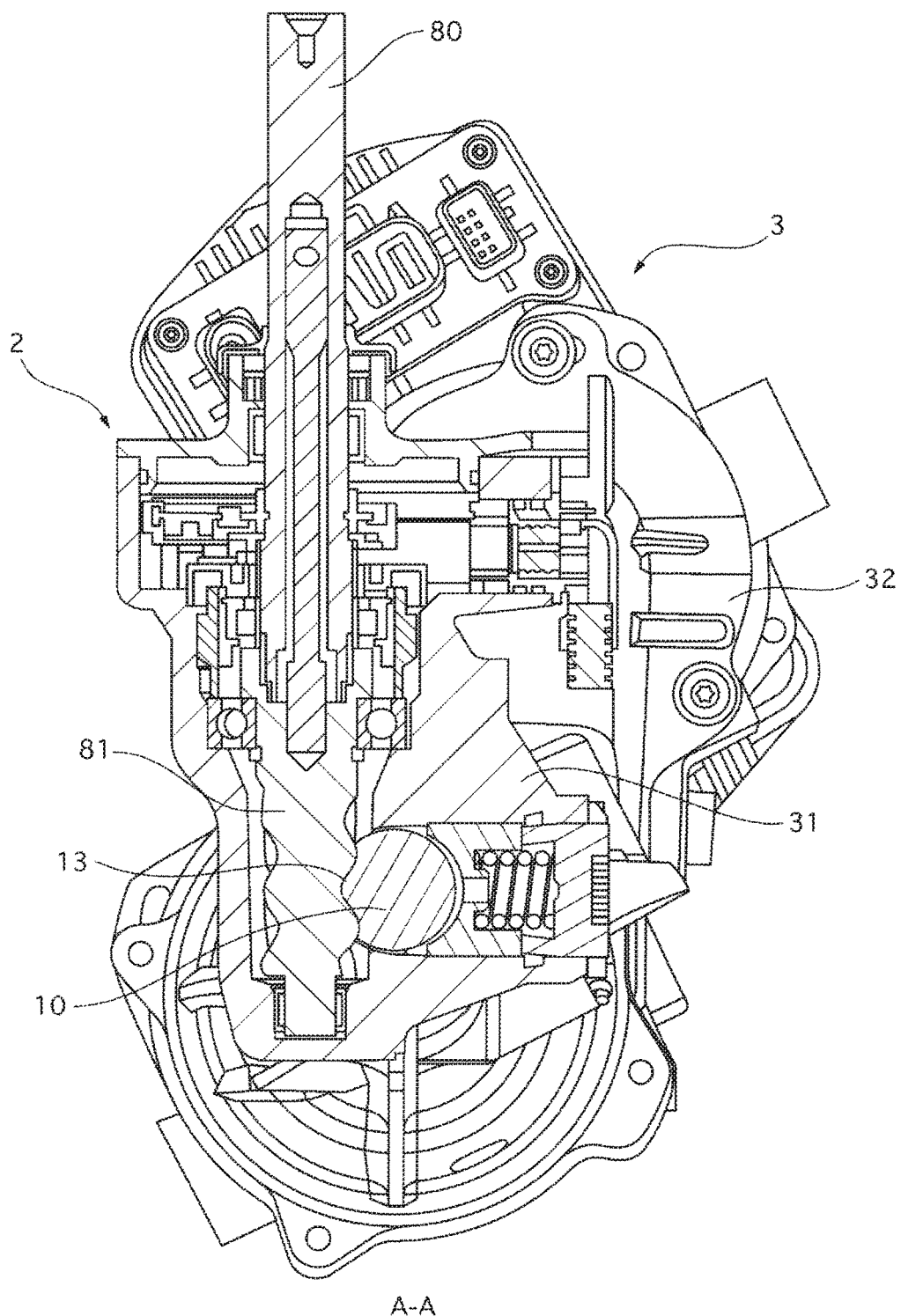
FIG. 3 is a sectional view of the power steering system of the Embodiment 1.
Figure 4:
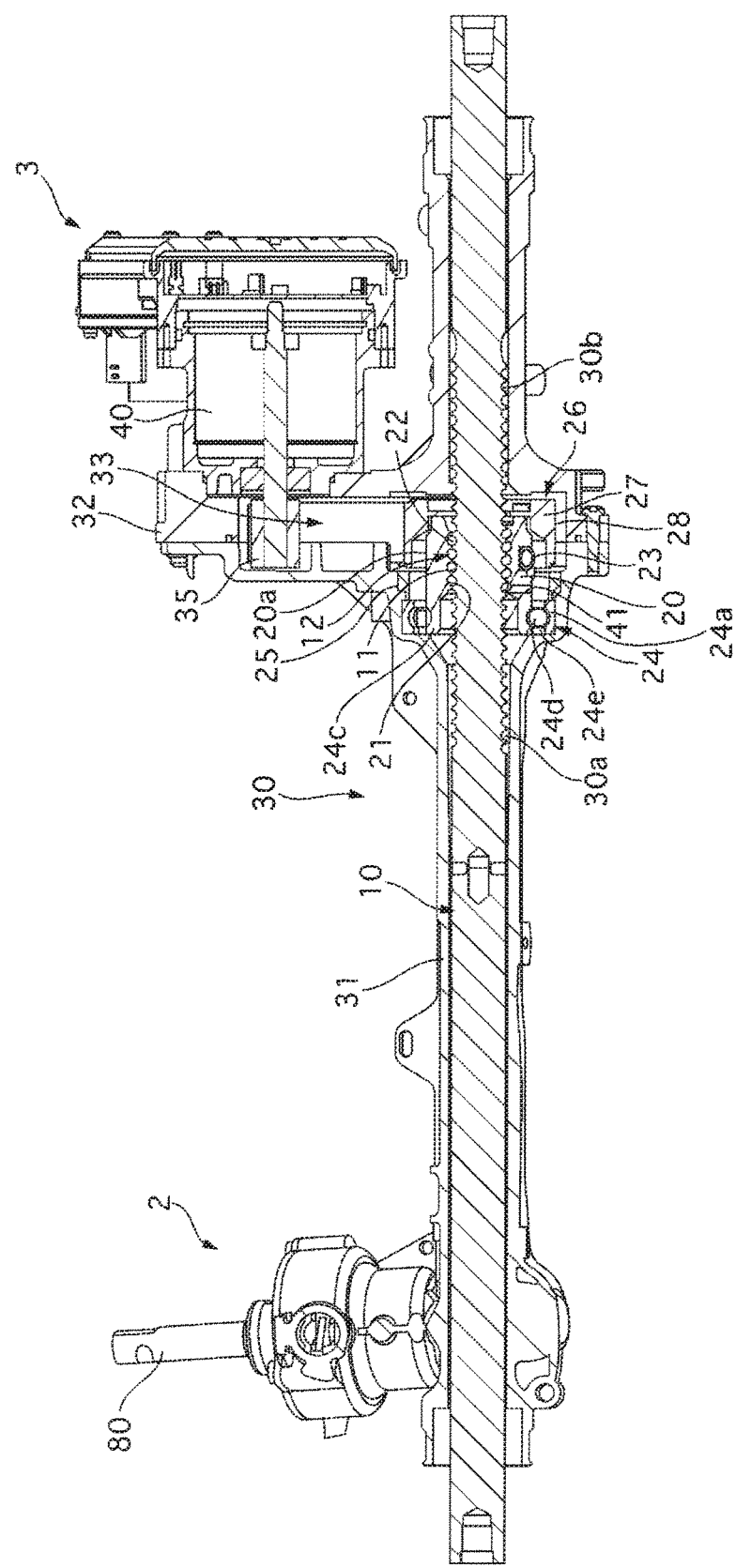
FIG. 4 is a sectional view of the power steering system of the Embodiment 1.
Figure 5:
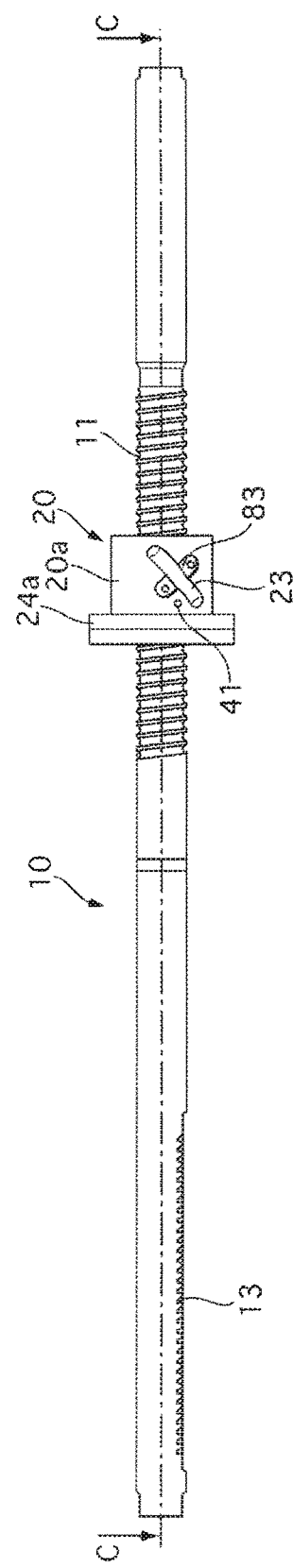
FIG. 5 is a front view of a wheel turning shaft and a nut according to the Embodiment 1.
Figure 6:
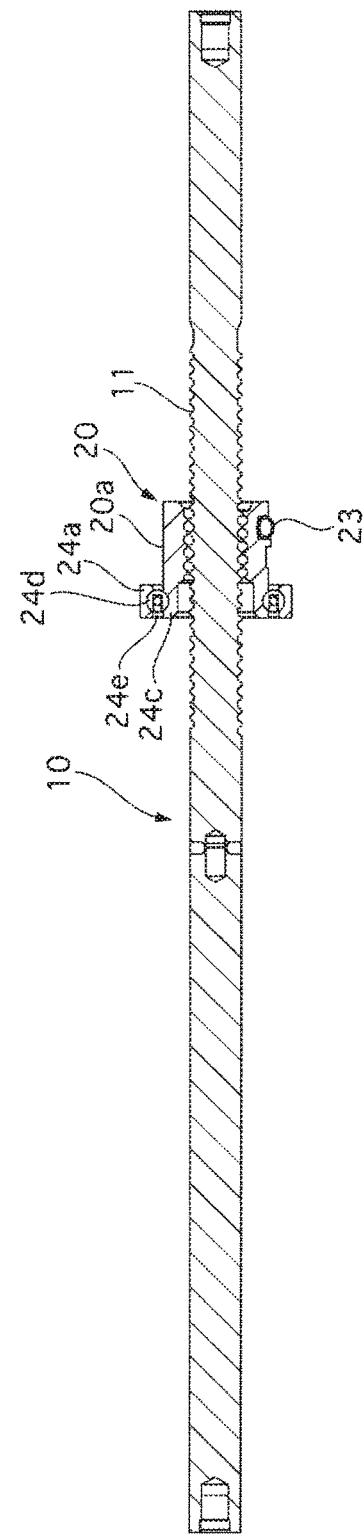
FIG. 6 is a sectional view of the wheel turning shaft and the nut according to the Embodiment 1.
Figure 7:
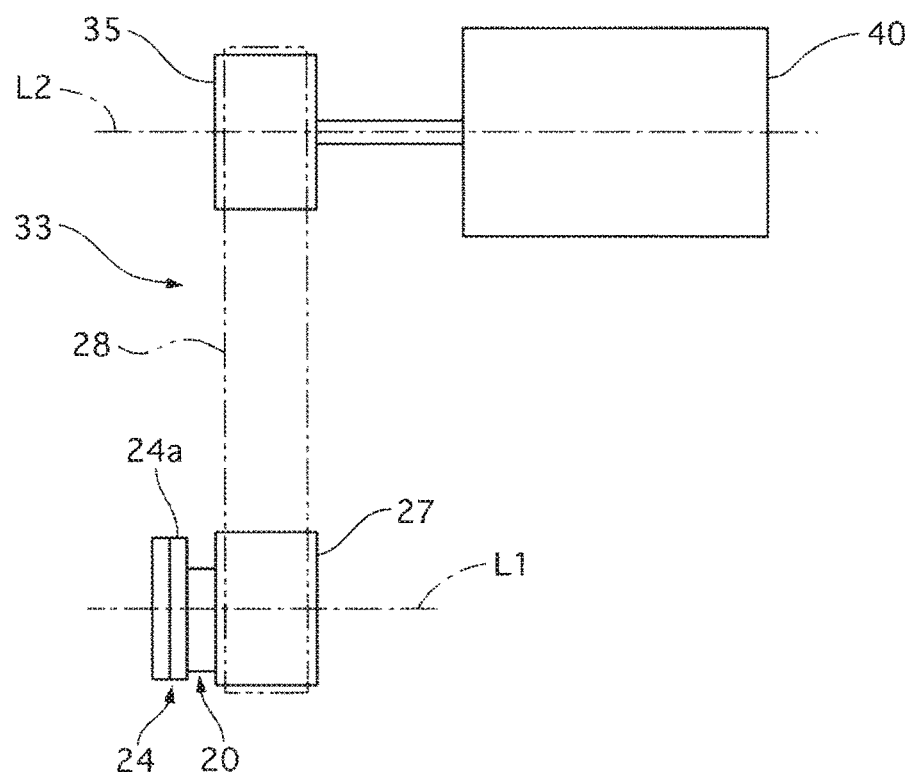
FIG. 7 is a diagram showing how an electric motor and the nut are connected to each other according to the Embodiment 1.

FIG. 1 is a front view of the power steering system 1. FIG. 2 is a view of the power steering system 1 viewed in an axial direction. FIG. 3 is a sectional view taken along line A-A in FIG. 1. FIG. 4 is a sectional view taken along line B-B in FIG. 2. FIG. 5 is a front view of a wheel turning shaft 10 and a nut 20. FIG. 6 is a sectional view taken along line C-C in FIG. 5. FIG. 7 is a diagram showing connection between the electric motor 40 and the nut 20.

The power steering system 1 includes a steering mechanism 2 which transmits rotation of a steering wheel turned by the driver to the wheel turning shaft 10 for turning a wheel(s) to be steered (or steered wheel), and an assist mechanism 3 which imparts an assisting force to the wheel turning shaft 10. The steering mechanism 2 includes a steering input shaft 80 connected to the steering wheel and a pinion 81 which rotates integral with the steering input shaft 80. The pinion 81 is engaged with a rack 13 formed in an outer periphery of the wheel turning shaft 10.

Each constituent element of the power steering system 1 is contained in a housing 30 formed of a wheel turning shaft containing portion 31 in which the wheel turning shaft 10 is contained to be displaceable in the axial direction and a decelerator containing portion 32 which is disposed in an axially middle portion of the wheel turning shaft containing portion 31 and formed to surround the wheel turning shaft 10. The decelerator containing portion 32 accommodates a later-mentioned decelerator 33.

The assist mechanism 3 includes the electric motor 40 and the screw mechanism 26 which transmits output of the electric motor 40 to the wheel turning shaft 10. The output of the electric motor 40 is controlled by a motor controller according to steering torque and steering amount entered in the steering wheel by the driver. The screw mechanism 26 includes the nut 20 and an output pulley 27. The output pulley 27 is a cylindrical member. The output pulley 27 is fixed to the nut 20 to be integrally rotatable. A cylindrical input pulley 35 is fixed to a drive shaft of the electric motor 40 to be integrally rotatable. A belt 28 is extended over the output pulley 27 and the input pulley 35. The decelerator 33 comprises the input pulley 35, the output pulley 27, and the belt 28. Hereinafter, a rotation axis of the nut 20 and the output pulley 27 is defined as a first reference axis L1, and that of the electric motor 40 and the input pulley 35 as a second reference axis L2.

The nut 20 is formed into a ring to surround the wheel turning shaft 10 and is rotatable relative to the wheel turning shaft 10. In an inner periphery of the nut 20A, a groove is formed in a spiral manner. This groove is a nut-side ball screw groove 21. The wheel turning shaft 10 also has a spiral groove in the outer periphery thereof, which is formed axially away from the rack 13. This groove is a wheel turning shaft-side ball screw groove 11. The nut-side ball screw groove 21 and the wheel turning shaft-side ball screw groove 11 together form a ball circulation groove 12 when the wheel turning shaft 10 is inserted in the nut 20. The ball circulation groove 12 is loaded with a plurality of metal balls 22. The balls 22 move within the ball circulation groove 12 by the nut 20 being rotated. The wheel turning shaft 10 moves in the longitudinal direction of the shaft 10 relative to the nut 20.

[Configuration of the Nut]

Figure 8:
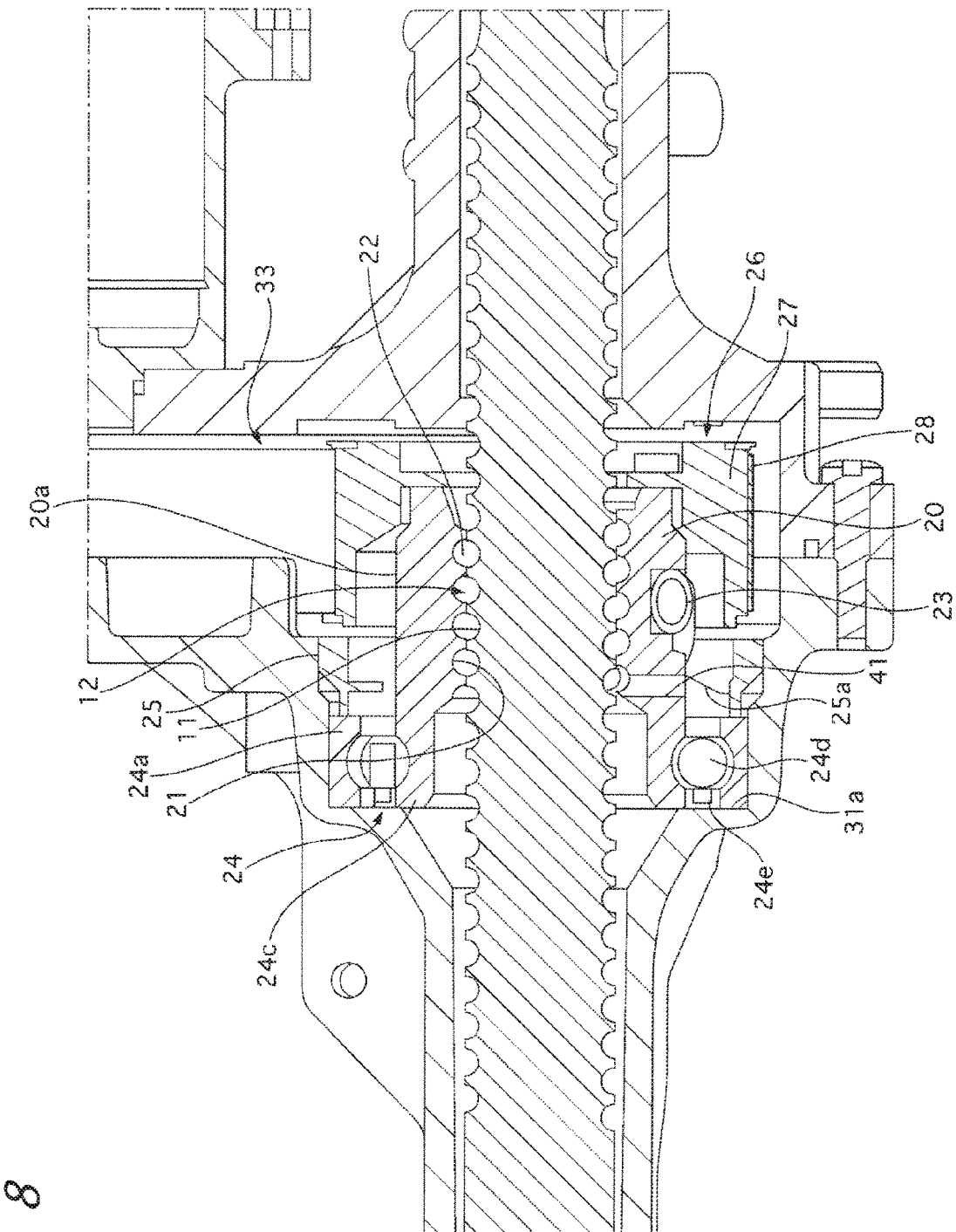
FIG. 8 is an enlarged sectional view of an assist mechanism and the vicinity thereof according to the Embodiment 1.
Figure 9:
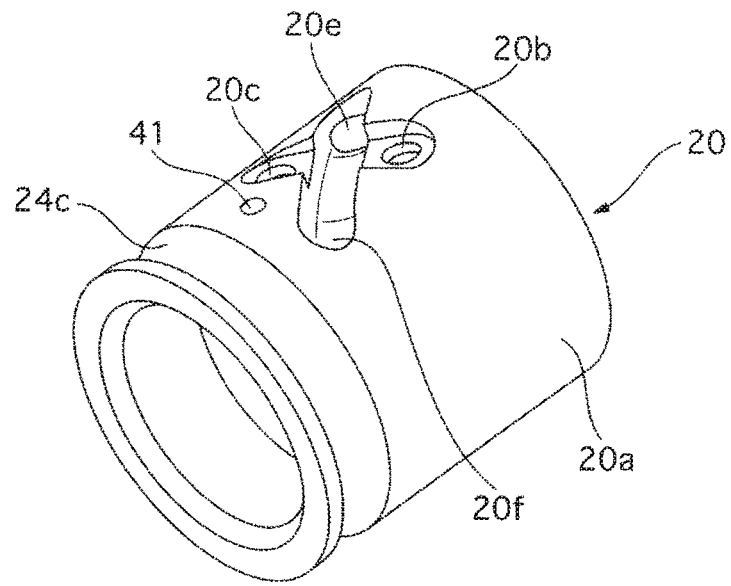
FIG. 9 is a perspective view of the nut of the Embodiment 1.
Figure 10:
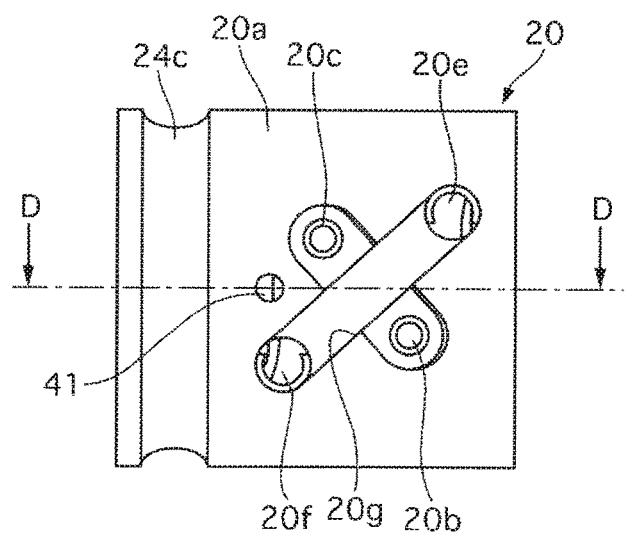
FIG. 10 shows the nut of the Embodiment 1, viewed from the outside in a radial direction.
Figure 11:
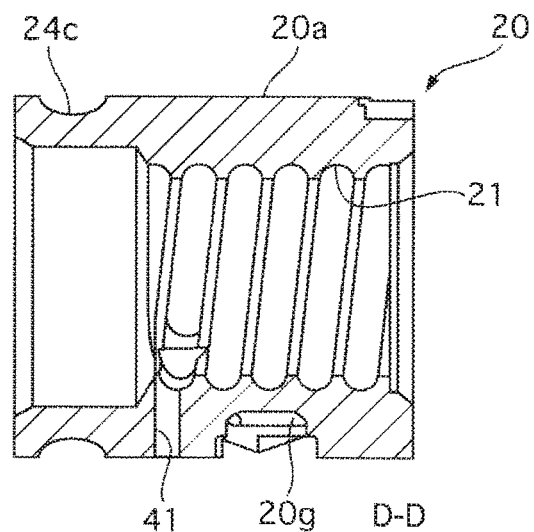
FIG. 11 is a sectional view of the nut of the Embodiment 1.

FIG. 8 is an enlarged sectional view of the assist mechanism 3 and the vicinity thereof in the power steering system 1. FIG. 9 is a perspective view of the nut 20. FIG. 10 shows the nut 20 viewed from the outside in a radial direction. FIG. 11 is a sectional view taken along line D-D in FIG. 10.

An inner race 24c of a bearing 24 is integrally formed in one axial end portion of the nut 20. The bearing 24 is a ball bearing with a seal, which includes an outer race 24a, balls 24d between the outer race 24a and the inner race 24c, and a seal member 24e for sealing a gap between the outer race 24a and the inner race 24c. The bearing 24 rotatably supports the nut 20 relative to the decelerator containing portion 32.

The other axial end portion of the nut 20, which is spaced apart from the inner race 24c of the nut 20, is a main body 20a. In an outer periphery of the main body 20a, there is formed a ball circulation groove first end side opening 20f which leads to a first end of the ball circulation groove 12. There is also formed a ball circulation groove second end side opening 20e in the outer periphery of the main body 20a. The opening 20e leads to a second end of the ball circulation groove 12. An engaging groove 20g to be engaged with a later-mentioned circulating member 23 is formed between the openings 20f and 20e. The tube-like circulating member 23 connects the openings 20f and 20e to each other, and has end portions inserted in the respective openings 20f and 20e.

A pair of internal thread portions 20b and 20c is formed in the outer periphery of the main body 20a. A line connecting the internal thread portions 20b and 20c intersects with a line connecting the ball circulation groove first end side opening 20f and the ball circulation groove second end side opening 20e. A fitting metal member 83 for fixing the circulating member 23 to the nut 20 is screwed onto the internal thread portions 20b and 20c (FIG. 5).

The balls 22 in the ball circulation groove 12 move to where the ball circulation groove first end side opening 20f of the ball circulation groove 12 is formed, and then enter the circulating member 23. The balls 22 then travel inside the circulating member 23 and return to the ball circulation groove 12 through the ball circulation groove second end side opening 20e. More precisely, the balls 22 move from where the opening 20f is to where the opening 20e is, instead of moving in the ball circulation groove 12 from end to end. If the wheel turning shaft 10 moves in the opposite direction, the balls 22 move in the opposite direction, too.

A communicating hole 41 allowing communication between the outer periphery side of the nut 20 and the inner periphery side of the nut 20 is formed in a portion of the main body 20a to be located on a side where the circulating member 23 is disposed and on the inner race 24c side (first end side). An inner periphery-side opening portion of the communicating hole 41 is located in the nut 20, avoiding a region in which the balls 22 circulate in the nut-side ball screw groove 21. The communicating hole 41 allows a first chamber 30a located on one side (left side as viewed in FIG. 4) of the bearing 24 and the screw mechanism 26 and a second chamber 30b on the other side (right side as viewed in FIG. 4) to be in communication with each other. An outer periphery-side opening portion of the communicating hole 41 is formed so as not to overlap the seal member 24e of the bearing 24 in the axial direction.

The outer race 24a of the bearing 24 is sandwiched between a lateral face 31a which is one-side lateral face of the decelerator containing portion 32 and a lock ring 25. In this manner, the nut 20 is limited in its axial movement relative to the housing 30.

The lock ring 25 includes a wall 25a extending on an inner periphery side thereof. The wall 25a is located between the opening portion of the communicating hole 41, which opens in the outer periphery of the nut 20, and the belt 28 when the lock ring 25 is attached to the decelerator containing portion 32.

[Operation]

Open portions at both ends of the wheel turning shaft containing portion 31 are closed with boots. The wheel turning shaft containing portion 31 is therefore substantially sealed, allowing little air to enter and exit the wheel turning shaft containing portion 31. The bearing 24 and the screw mechanism 26 are filled with grease inside, so that air hardly passes through the bearing 24 and the screw mechanism 26. As the result, the movement of the wheel turning shaft 10 changes air pressure in a space enclosed by the bearing 24, the screw mechanism 26, and the boots. The change in the air pressure might deform the boots and get the boots caught in nearby parts.

To solve the problem, it is only required to allow communication between the first and second chambers 30a and 30b of the housing 30. However, if a communicating hole is simply formed in the housing 30, the housing 30 is deteriorated in strength. If the thickness of the housing 30 is secured to ensure the strength of the housing 30, this increases the size and weight of the housing 30.

According to the Embodiment 1, therefore, the communicating hole 41 for allowing communication between the first and second chambers 30a and 30b of the housing 30 is formed in the nut 20.

This eliminates the need for a communicating hole to be formed in the housing 30 and suppresses a deterioration in strength of the housing 30. Even if a communicating hole is formed in the housing 30, it is also possible to reduce sectional area of the communicating hole formed in the housing 30, suppressing a deterioration in strength of the housing 30.

According to the Embodiment 1, the communicating hole 41 is formed in a portion of the main body 20a of the nut 20, avoiding a region in which the balls 22 circulate in the nut-side ball screw groove 21.

In order to establish communication between the first and second chambers 30a and 30b of the housing, it is an idea to form a communicating hole in the bearing 24. However, if the communicating hole is intended to be formed in the bearing 24, it is required to consider effects on an axle-supporting performance of the bearing 24, which complicates a designing process. In this regard, the Embodiment 1 which forms the communicating hole 41 in the main body 20a of the nut 20 requires no consideration for the effects of formation of the communicating hole 41 on the axle-supporting performance of the bearing 24.

According to the Embodiment 1, the communicating hole 41 is formed to allow communication between the inner periphery side of the nut 20 and the outer periphery side of the nut 20, the nut 20 being shaped like a ring.

When the communicating hole 41 is formed in the nut 20 in an axially penetrating manner, it is required to ensure the strength of the nut 20 by increasing the thickness of the nut 20. The Embodiment 1, however, makes it possible to downsize the nut 20 in radial dimension, as compared to a case in which the communicating hole 41 extends through the nut 20 in the axial direction.

The Embodiment 1 forms the opening portion of the communicating hole 41 in the outer periphery of the nut 20 so as not to overlap the seal member 24e of the bearing 24 in the axial direction.

This prevents the problem that the communicating hole 41 inhibits the seal member 24e from exerting a sealing performance or the communicating hole 41 is blocked by the seal member 24e.

In addition, according to the Embodiment 1, the wall 25a is disposed in the lock ring 25 to extend on the inner periphery side of the lock ring 25. The wall 25a is located between the opening portion of the communicating hole 41, which is located in the outer periphery of the nut 20, and the belt 28 when the lock ring 25 is attached to the decelerator containing portion 32.

Grease or the like leaking through the communicating hole 41 is therefore suppressed from spattering toward the belt 28 due to the rotation of the nut 20.

[Advantages]

(1) A power steering system comprises:

the wheel turning shaft 10 which moves in the axial direction along with the rotation of the steering wheel to turn the steered wheel;

the housing 30 configured to include the wheel turning shaft containing portion 31 in which the wheel turning shaft 10 is contained to be movable in the axial direction, and the decelerator containing portion 32 which is disposed in the axially middle portion of the wheel turning shaft containing portion and formed to surround the wheel turning shaft;

the wheel turning shaft-side ball screw groove 11 configured to be formed in the outer periphery of the wheel turning shaft 10 and formed into a spiral groove;

the nut 20 configured to be disposed inside the decelerator containing portion 32 and include the main body 20a formed into a ring to surround the wheel turning shaft 10;

the bearing 24 configured to be disposed between an inner wall of the decelerator containing portion 32 and the nut 20 in a radial direction, where the rotation axis of the nut 20 is a central axis, and the radial direction is a radiation direction relative to the central axis, the bearing 24 being formed to surround the nut 20 and rotatably supporting the nut relative to the housing;

the nut-side ball screw groove 21 configured to be formed in the inner periphery of the nut 20, formed into a spiral groove, and form the ball circulation groove 12 together with the wheel turning shaft-side ball screw groove 11;

the plurality of balls 22 configured to be disposed in the ball circulation groove 12;

the output pulley 27 configured to be disposed in the nut 20 and formed into a cylinder;

the input pulley 35 configured to be so disposed that the second reference axis L2 which is a rotation axis is radially offset relative to the first reference axis L1 which is the rotation axis of the nut 20, the input pulley 35 being formed into a cylinder;

the belt 28 (transmission member) configured to extend over the output and input pulleys 27 and 35 and transmit the rotation of the input pulley 35 to the output pulley 27;

the electric motor 40 configured to rotationally drive the input pulley 35 to rotationally drive the nut 20 through the belt 28 and the output pulley 27, and impart a steering force to the wheel turning shaft 10 by the rotation of the nut 20 being converted into axial motion of the wheel turning shaft 10;

the circulation member 23 configured to connect first and second ends of the ball circulation groove 12 so that the plurality of balls 22 may circulate from the first end of the ball circulation groove 12 to the second end or from the second to the first end; and the communicating hole 41 configured to be formed in a portion of the nut 20, avoiding a region in which the balls 22 circulate in the nut-side ball screw groove 21, or in the member disposed radially further outside than the nut 20 and radially further inside than the inner wall of the decelerator containing portion 32, the communicating hole 41 for allowing communication between the first and second chambers, where space between the housing 30 and the wheel turning shaft 10 is divided into two, and the first chamber is a space located on one side of the bearing 24 and the plurality of balls 22 on the first reference axis L1, while the second chamber is a space located on the other side.

This eliminates the need for the communicating hole to be formed in the housing 30, which suppresses a deterioration in strength of the housing 30. Even if the communicating hole is formed in the housing 30, it is possible to reduce sectional area of the communicating hole formed in the housing 30, suppressing a deterioration in strength of the housing 30.

(2) The communicating hole 41 is formed in a portion of the nut 20, avoiding the region in which the plurality of balls 22 circulate in the nut-side ball screw groove 21.

This eliminates the need for consideration for effects of formation of the communicating hole 41 on the axle-supporting performance of the bearing 24.

(3) The communicating hole 41 is formed to allow communication between the inner periphery side of the nut 20 with the outer periphery side of the nut 20 shaped like a ring.

This downsizes the nut 20 in the radial dimension thereof.

(4) The bearing 24 is a seal bearing which comprises the inner race 24c, the outer race 24a, a plurality of balls 24d disposed between the inner race 24c and the outer race 24a, and the seal member 24e for sealing the gap between the inner race 24c and the outer race 24a. The communicating hole 41 is formed in such a position as not to overlap the seal member 24e in the direction of the first reference axis L1.

This prevents the problem that the communicating hole 41 inhibits the seal member 24e from exerting the sealing performance or the seal member 24e being blocked by the seal member 24e.

(5) The wall 25a is formed to protrude from the inner wall of the decelerator containing portion 32 in the radially inward direction, and disposed between the opening portion of the communicating holes 41, which is located in the outer periphery of the nut 20, and the belt 28 in the direction of the first reference axis L1.

This suppresses grease or the like leaking through the communicating hole 41 from spattering toward the belt 28.

[Embodiment 2]

An Embodiment 2 differs from Embodiment 1 in the position where the communicating hole 41 is formed. Descriptions will be omitted about components identical to those of the Embodiment 1.

[Configuration of the Nut]

Figure 12:
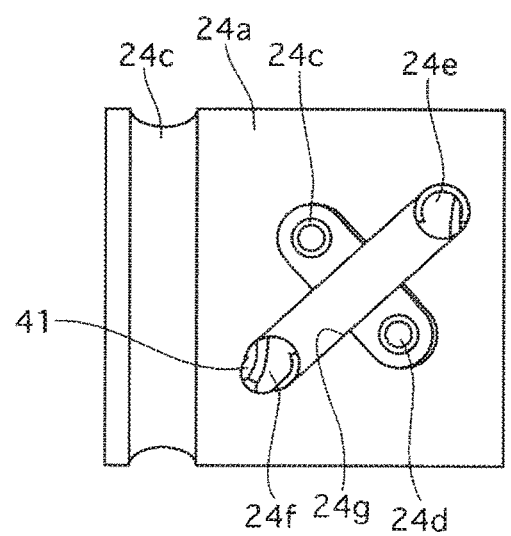
FIG. 12 shows a nut of an Embodiment 2, viewed from the outside in a radial direction.

FIG. 12 shows the nut 20 viewed from the outside in the radial direction. The communicating hole 41 is formed to be continuous with the ball circulation groove first end side opening 20f located on the inner race 24c side (first end side) of the main body 20a. The communicating hole 41 is formed on the inner race 24c side (first end side) relative to the center of the ball circulation groove first end side opening 20f.

[Operation]

According to the Embodiment 2, the communicating hole 41 is formed to be continuous with the opening 20f located on the inner race 24c side (first end side) of the main body 20a. This makes it possible to form the communicating hole 41 by enlarging the opening 20f, instead of providing the communicating hole 41 separately.

The Embodiment 2 provides the communicating hole 41 on the inner race 24c side (first end side) relative to the center of the opening 20f. This suppresses the communicating hole 41 from interfering with a region of the nut-side ball screw groove 21, in which the balls 22 circulate.

[Advantages]

(6) The nut 20 includes the pair of ball circulation groove openings 20e and 20f. The openings 20e and 20f have first ends which open in the nut-side ball screw groove 21, and second ends which open in the outer periphery of the nut 20. The circulation member 23 connects the openings 20e and 20f to each other. The communicating hole 41 is formed to be continuous with the opening 20f located closer to the bearing 24 than the opening 20e.

This makes it possible to form the communicating hole 41 by enlarging the opening 20f, instead of providing the communicating hole 41 separately.

(7) The communicating hole 41 is formed to be continuous with the opening 20f located closer to the bearing 24 and disposed on the bearing 24 side in the direction of the first reference axis L1.

This suppresses the communicating hole 41 from interfering with the region of the ball circulation groove 12, in which the balls 22 circulate.

[Embodiment 3]

An Embodiment 3 differs from Embodiment 1 in the position where the communicating hole 41 is formed. Descriptions will be omitted about components identical to those of the Embodiment 1.

[Configuration of the Nut]

Figure 13:
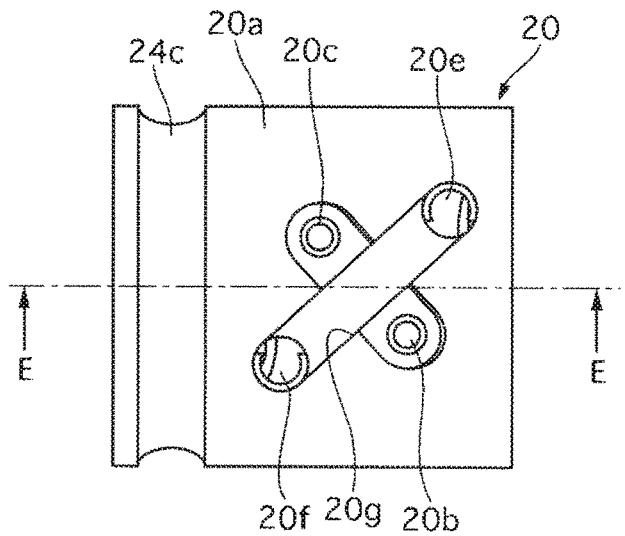
FIG. 13 shows a nut of an Embodiment 3, viewed from the outside in a radial direction.
Figure 14:
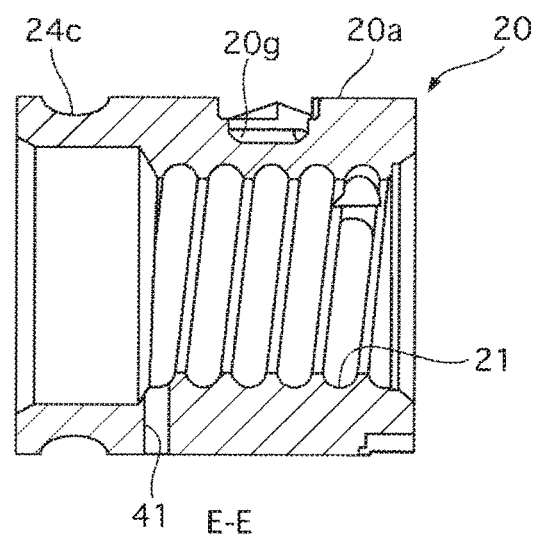
FIG. 14 is a sectional view of the nut of the Embodiment 3.

FIG. 13 shows the nut 20 viewed from the outside in the radial direction. FIG. 14 is a sectional view taken along line E-E in FIG. 13.

The communicating hole 41 allowing communication between the outer periphery of side the nut 20 and the inner periphery side of the nut 20 is formed in a portion of the main body 20a to be located on a circumferentially opposite side from where the circulation member 23 is disposed and on the inner race 24c side (first end side). The inner periphery-side opening portion of the communicating hole 41 is formed in a portion of the nut, avoiding a region in which the balls 22 circulate in the nut-side ball screw groove 21.

[Operation]

According to the Embodiment 3, the communicating hole 41 allowing communication between the outer periphery of side the nut 20 and the inner periphery side of the nut 20 is formed in a portion of the main body 20a to be located on the circumferentially opposite side from where the circulation member 23 is disposed and on the inner race 24c side (first end side). This suppresses the communicating hole 41 from interfering with the circulation member 23.

[Advantage]

(8) The nut 20 includes the pair of ball circulation groove openings 20e and 20f. The openings 20e and 20f have the first ends which open in the nut-side screw groove 21, and the second ends which open in the outer periphery of the nut 20. The circulation member 23 connects the openings 20e and 20f to each other. The communicating hole 41 is formed in the nut 20 to be located on the circumferentially opposite side from the circulation member 23, where the circumferential direction is the direction around the reference axis L1.

This suppresses the communicating hole 41 from interfering with the circulation member 23.

[Embodiment 4]

An Embodiment 4 differs from Embodiment 1 in the position and number of the communicating hole 41. Descriptions will be omitted about components identical to those of the Embodiment 1.

[Configuration of the Nut]

Figure 15:
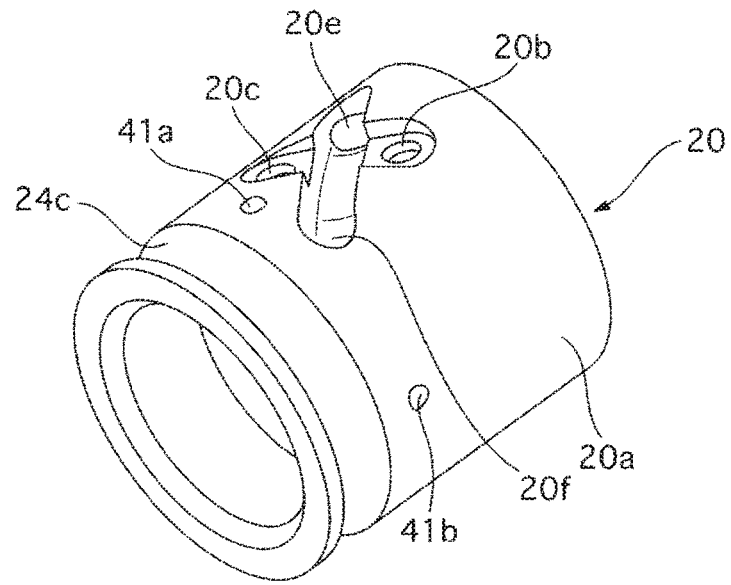
FIG. 15 is a perspective view of a nut of an Embodiment 4.

FIG. 15 is a perspective view of the nut 20.

A communicating hole 41a allowing communication between the outer periphery side of the nut 20 and the inner periphery side of the nut 20 is formed in a portion of the main body 20a to be located on the side where the circulation member 23 is disposed and on the inner race 24c side (first end side). The communicating hole 41a has an inner periphery-side opening portion that is formed in a portion of the nut 20, avoiding the region in which the balls 22 circulate in the nut-side ball screw groove 21.

A communicating hole 41b is formed in a circumferentially different position from the communicating hole 41a. As with the communicating hole 41a, the communicating hole 41b has an inner periphery-side opening portion that is formed in a portion of the nut 20, avoiding the region in which the balls 22 circulate in the nut-side ball screw groove 21.

[Operation]

The Embodiment 4 provides the communicating hole 41b in the main body 20a to be located in the circumferentially different position from the communicating hole 41a formed on the side where the circulation member 23 is disposed. If either one of the communicating holes 41a and 41b is blocked with grease or the like, the other communicating hole allows air to flow between the first and second chambers 30a and 30b.

[Advantage]

(9) A plurality of communicating holes 41 are formed in the nut 20 to extend in a circumferential direction of the nut 20, where the circumferential direction is a direction around the first reference axis L1.

If one or more, but not all, of the communicating holes 41 are blocked with grease or the like, the other communicating holes 41 allow air to flow between the first and second chambers 30a and 30b.

[Embodiment 5]

An Embodiment 5 differs from the Embodiment 1 in the position and shape of the communicating hole 41. Descriptions will be omitted about components identical to those of the Embodiment 1.

[Configuration of the Nut]

Figure 16:
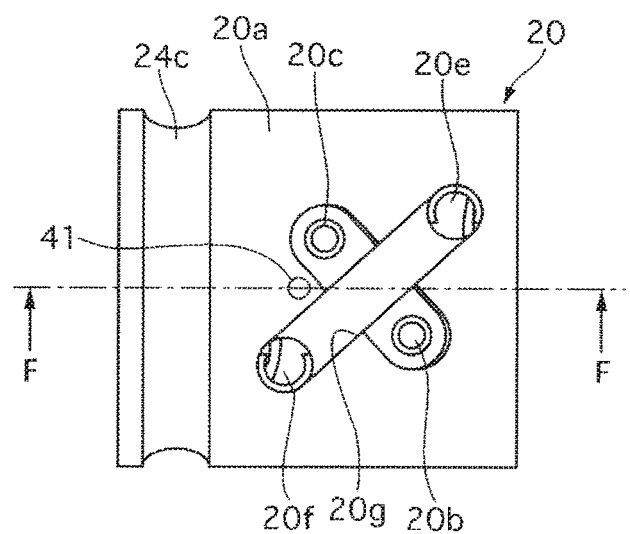
FIG. 16 shows a nut of an Embodiment 5, viewed from the outside in a radial direction.
Figure 17:
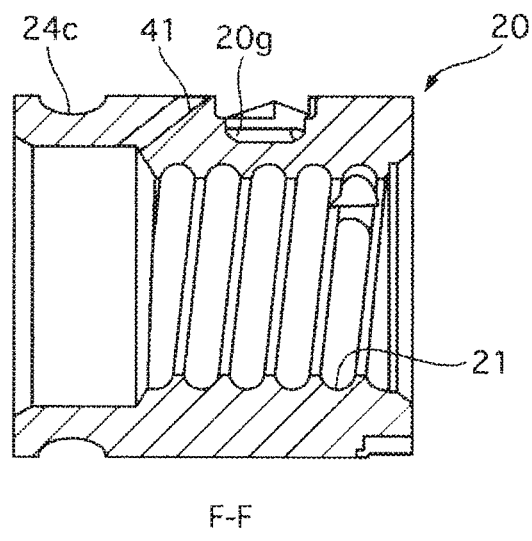
FIG. 17 is a sectional view of the nut of the Embodiment 5.

FIG. 16 shows the nut 20 viewed from the outside in the radial direction. FIG. 17 is a sectional view taken along line F-F in FIG. 16.

The communicating hole 41 allowing communication between the outer periphery side of the nut 20 and the inner periphery side of the nut 20 is formed in a portion of the main body 20a to be located on the circumferentially opposite side from where the circulation member 23 is disposed and on the inner race 24c side (first end side).

The communicating hole 41 has an inner periphery-side opening portion located closer to the inner race 24c (first end side) than an outer periphery-side opening portion. The communicating hole 41 is formed to be inclined with respect to the radial direction of the nut 20 or is formed at an angle with respect to the radial direction of the nut 20.

The inner periphery-side opening portion of the communicating hole 41 is so formed as to avoid the nut-side ball screw groove 21. The position of the outer periphery-side opening portion of the communicating hole 41 in relation with the axial direction of the nut 20 overlaps the region of the nut-side ball screw groove 21, in which the balls 22 circulate.

[Operation]

The inner periphery-side opening portion of the communicating hole 41 is formed closer to the inner race 24c (first end side) than the outer periphery-side opening portion, so that the communicating hole 41 is formed inclined with respect to the radial direction of the nut 20 or is formed at an angle with respect to the radial direction of the nut 20. The inner periphery-side opening portion of the communicating hole 41 needs to be located out of the region in which the balls 22 circulate in the nut-side ball screw groove 21. The outer periphery-side opening portion of the communicating hole 41 needs to be formed in such a position as not to interfere with the inner race 24c (bearing 24). If the communicating hole 41 is formed along the radial direction of the nut 20 under the foregoing conditions, the nut 20 has to be increased in axial length. According to the Embodiment 5, the axial length of the nut 20 can be reduced since the connecting hole 41 is formed at an angle with respect to the radial direction of the nut 20.

The position of the outer periphery-side opening portion of the communicating hole 41 in relation with the axial direction of the nut 20 overlaps the region of the nut-side ball screw groove 21, in which the balls 22 circulate. This also allows the axial length of the nut 20 to be reduced.

[Advantages]

(10) The communicating hole 41 is so formed that the inner periphery-side opening portion in the nut 20 is located closer to the bearing 24 than the outer periphery-side opening in the nut 20 in the direction of the first reference axis L1. The communicating hole 41 is thus formed at an angle with respect to the radial direction of the nut 20.

This makes it possible to reduce the axial length of the nut 20.

(11) The one of the pair of opening portions of the communicating hole 41, which is located in the outer periphery of the nut 20, overlaps the region in which the plurality of balls 22 circulate, in the direction of the first reference axis L1.

This makes it possible to reduce the axial length of the nut 20.

[Embodiment 6]

An Embodiment 6 differs from the Embodiment 1 in the position where the communicating hole is formed. Descriptions will be omitted about components identical to those of the Embodiment 1.

[Configuration of the Nut]

Figure 18:
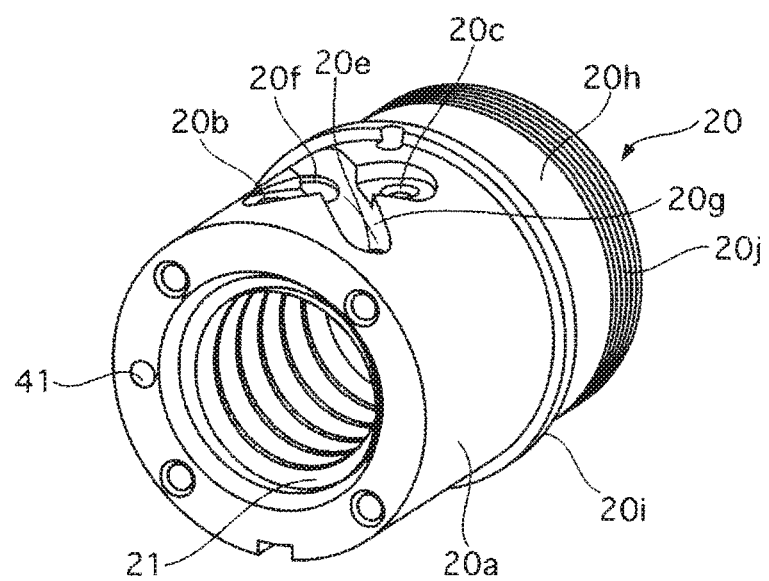
FIG. 18 is a perspective view of a nut of an Embodiment 6.
Figure 19:
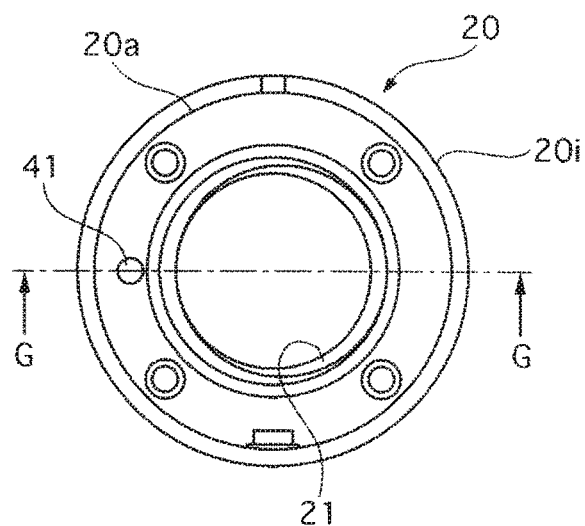
FIG. 19 shows the nut of the Embodiment 6, viewed in an axial direction.
Figure 20:
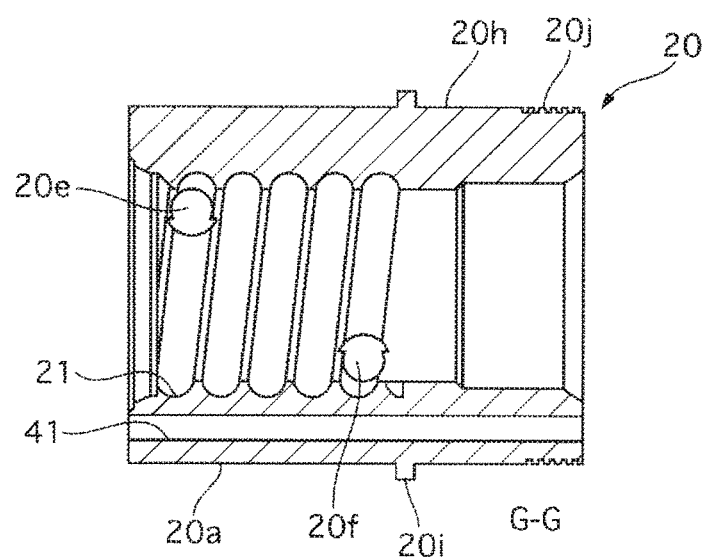
FIG. 20 is a sectional view of the nut of the Embodiment 6.

FIG. 18 is a perspective view of the nut 20. FIG. 19 shows the nut 20 viewed in an axial direction. FIG. 20 is a sectional view taken along line F-F in FIG. 19.

Unlike the nut 20 of the Embodiment 1, according to the nut 20 of the Embodiment 6, the inner race 24c of the bearing 24 is formed as a separate body. In one axial end of the nut 20, there is formed an insert portion 20h to be inserted in the inner periphery of the inner race 24c as the separate body. In the other axial end of the nut 20, there is formed the main body 20a. The insert portion 20h and the main body 20a have substantially the same diameter. Formed between the insert portion 20h and the main body 20a is a bearing positioning portion 20i having a larger diameter than the insert portion 20h and the main body 20a. When the insert portion 20h is inserted into the inner periphery of the inner race 24c, a lateral face of the inner race 24c comes into contact with the bearing positioning portion 20i, determining the position of the bearing 24 relative to the nut 20. An internal thread portion 20j is formed in one end of the main body 20a, and a locknut is screwed onto the internal thread portion 20j. The inner race 20c is held between a lateral face of the locknut and the bearing positioning portion 20i.

The communicating hole 41 is formed between inner and outer peripheral faces of the nut 20 to extend in the axial direction, and connects both ends of the nut 20.

[Operation]

The Embodiment 6 provides the communicating hole 41 between the inner and outer peripheral faces of the nut 20 to extend in the axial direction. It is then not required to secure a space for forming the communicating hole 41 in the axial direction of the nut 20. This makes it possible to reduce the axial length of the nut 20.

[Advantage]

(12) The communicating hole 41 is formed to connect both ends of the nut 20, which are located on the first reference axis L1, and extend in the direction of the first reference axis L1.

It is therefore not required to secure a space for forming the communicating hole 41 in the axial direction of the nut 20. This makes it possible to reduce the axial length of the nut 20.

[Embodiment 7]

An Embodiment 7 differs from Embodiment 1 in a member where the communicating hole 41 is formed. Descriptions will be omitted about components identical to those of the Embodiment 1.

[Configuration of the Nut]

Figure 21:
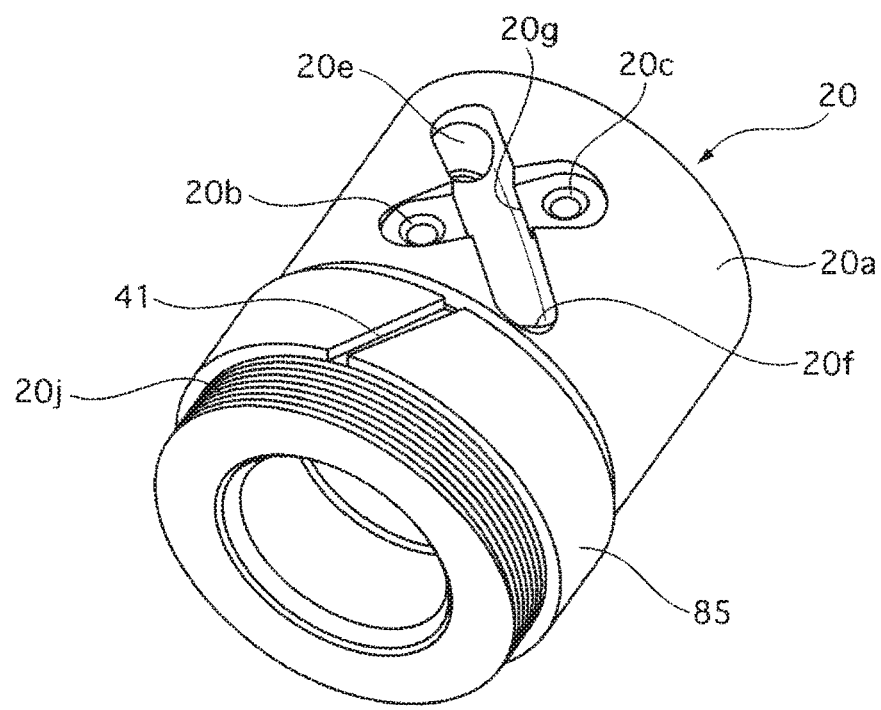
FIG. 21 is a perspective view of a nut of an Embodiment 7.

FIG. 21 is a perspective view of the nut 20.

According to the nut 20 of the Embodiment 7, the inner race 24c of the bearing 24 is formed as a separate body, as with the nut 20 of the Embodiment 6. In the Embodiment 6, the insert portion 20h of the nut 20 is directly inserted into the inner race 24c, while in the Embodiment 7 a spacer 85 is provided between the inner race 24c and the nut 20.

The spacer 85 has a ring-like shape. In an outer peripheral face of the spacer 85, there is formed the communicating hole 41. The communicating hole 41 is formed to be inclined with respect to the axial direction or formed at an angle with respect to the axial direction.

The spacer 85 may be provided between the outer race 24a and the decelerator containing portion 32. The communicating hole 41 may be formed in a spiral shape.

[Operation]

In the Embodiment 7, the communicating hole 41 is formed in the spacer 85. This eliminates the need for consideration for effects of the communicating hole 41 when designing the nut 20 and the bearing 24, and thus facilitates the designing.

When formed in the spacer, the communicating hole 41 may be formed in a spiral shape. By so doing, the effects of formation of the communicating hole 41 on the spacer are dispersed in a circumferential direction.

[Advantages]

(13) There is further provided the ring-shaped spacer 85 located between the radially outer periphery of the bearing 24 and the decelerator containing portion 32 or between the radially inner side of the bearing 24 and the nut 20. The communicating hole 41 is formed in the spacer 85.

(14) The communicating hole 41 is formed into a spiral groove provided in the inner or outer periphery of the spacer 85.

The formation of the communicating hole 41 in the spacer 85 disperses the effects in the circumferential direction.

[Embodiment 8]

An Embodiment 8 differs from Embodiment 1 in the position where the communicating hole 41 is formed. Descriptions will be omitted about components identical to those of the Embodiment 1.

[Configuration of the Nut]

Figure 22:
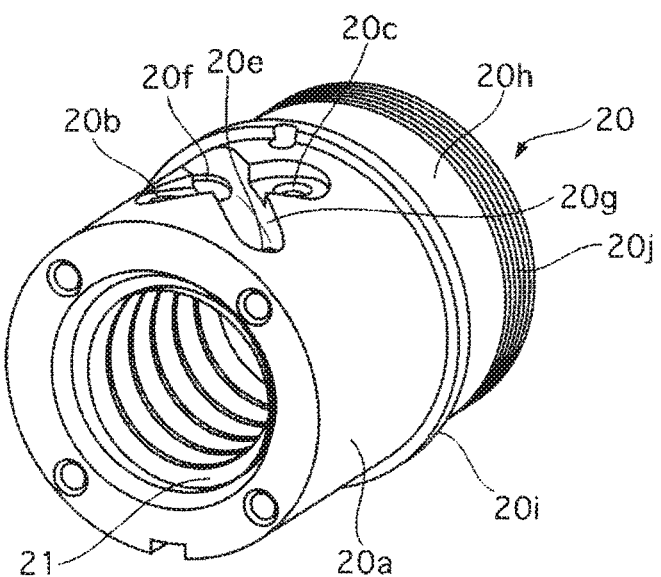
FIG. 22 is a perspective view of a nut of an Embodiment 8.
Figure 23:
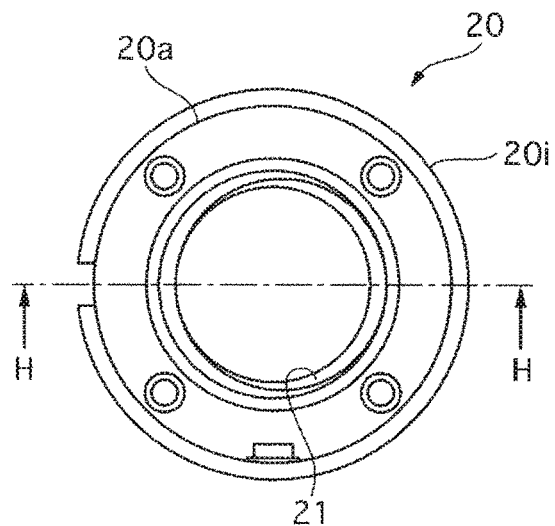
FIG. 23 shows the nut of the Embodiment 8, viewed from the outside in a radial direction.
Figure 24:
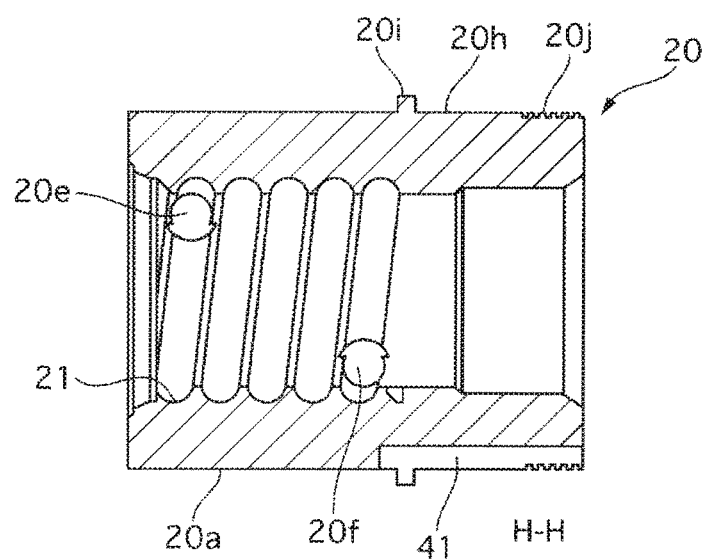
FIG. 24 is a sectional view of the nut of the Embodiment 8.

FIG. 22 is a perspective view of the nut 20. FIG. 23 shows the nut 20 viewed from the outside in the radial direction. FIG. 24 is a sectional view taken along line G-G in FIG. 23.

According to the nut 20 of the Embodiment 8, the inner race 24c of the bearing 24 is formed as a separate body, as the nut 20 of the Embodiment 6.

In the outer peripheral face of the nut 20, the communicating hole 41 is formed into a groove to extend from an end portion at one side (insert portion 20h side) of the main body 20a to the internal thread portion 20j. In other words, the communicating hole 41 is formed in the portion where the bearing 24 is disposed, avoiding the main body 20a. The communicating hole 41 may be formed in the bearing 24.

[Operation]

According to the Embodiment 8, since the communicating hole 41 is formed in the bearing 24, the nut 20 is less affected by the formation of the communicating hole 41.

[Advantage]

(15) The communicating hole 41 is formed in the bearing 24.

The nut 20 is therefore less affected by the formation of the communicating hole 41.

[Embodiment 9]

An Embodiment 9 differs from Embodiment 1 in that the communicating hole 41 is formed in the wheel turning shaft 10. Descriptions will be omitted about components identical to those of the Embodiment 1.

[Configuration of the Communicating Hole]

Figure 25:
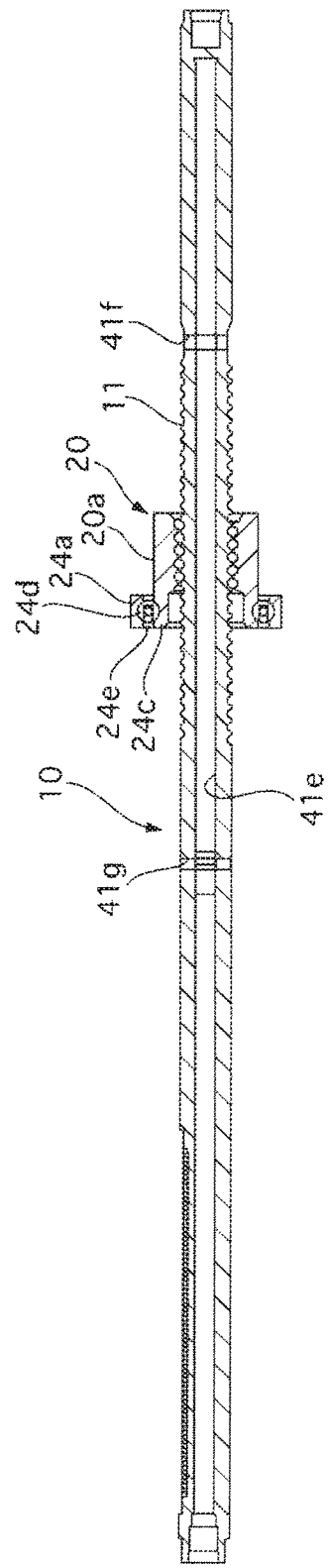
FIG. 25 is an enlarged sectional view of an assist mechanism and the vicinity thereof according to an Embodiment 9.

FIG. 25 is an enlarged sectional view of the assist mechanism 3 and the vicinity thereof in the power steering system 1.

A connecting hole 41e is formed through the wheel turning shaft 10 in the axial direction concentrically with a central axis of the wheel turning shaft 10. A first chamber-side opening portion 41g is radially formed in the wheel turning shaft 10 to be located on one side of the nut-side ball screw groove 21, and a second chamber-side opening portion 41f is radially formed on the other side. The first chamber-side opening portion 41g and the second chamber-side opening portion 41f are communicated with the connecting hole 41e. The first chamber-side opening portion 41g, the second chamber-side opening portion 41f, and the connecting hole 41e constitute the communicating hole 41. The communicating hole 41 allows communication between the first chamber 30a located on one side (left side in FIG. 25) of the bearing 24 and the screw mechanism 26 and the second chamber 30b located on the other side (right side in FIG. 25).

[Operation]

In the Embodiment 9, the communicating hole 41 provided in the wheel turning shaft 10. The number of members mounted on the nut 20 is large for the size of the nut 20, so that there is a small space for the communicating hole 41 in the nut 20. The wheel turning shaft 10, however, has a larger space for the communicating hole 41, as compared to the nut 20. This facilitates the designing of the communicating hole 41.

Furthermore, there is no need to form a communicating hole in the housing 30, which suppresses a deterioration in strength of the housing 30. Even if the communicating hole is formed in the housing 30, it is possible to reduce the sectional area of the communicating hole formed in the housing 30, suppressing a deterioration in strength of the housing 30.

[Advantage]

(16) A power steering system comprises:

the wheel turning shaft 10 which moves in the axial direction along with the rotation of the steering wheel to turn the steered wheel;

the housing 30 configured to include the wheel turning shaft containing portion 31 in which the wheel turning shaft 10 is contained to be movable in the axial direction, and the decelerator containing portion 32 which is disposed in an axially middle portion of the wheel turning shaft containing portion and formed to surround the wheel turning shaft;

the wheel turning shaft-side ball screw groove 11 configured to be formed in the outer periphery of the wheel turning shaft 10 and formed into a spiral groove;

the nut 20 configured to be disposed inside the decelerator containing portion 32 and include the main body formed into a ring to surround the wheel turning shaft 10;

the bearing 24 configured to be disposed between an inner wall of the decelerator containing portion 32 and the nut 20 in a radial direction, where the rotation axis of the nut 20 is a central axis, and the radial direction is a radiation direction relative to the central axis, the bearing 24 being formed to surround the nut 20 and rotatably supporting the nut relative to the housing 30;

the nut-side ball screw groove 21 configured to be disposed in the inner periphery of the nut 20, formed into a spiral groove, and form the ball circulation groove 12 together with the wheel turning shaft-side ball screw groove 11;

the plurality of balls 22 configured to be disposed in the ball circulation groove 12;

the output pulley 27 configured to be disposed in the nut 20 and formed into a cylinder;

the input pulley 35 configured to be so disposed that the second reference axis L2 which is the rotation axis is radially offset relative to the first reference axis L1 which is the rotation axis of the nut 20, the input pulley 35 being formed into a cylinder;

the belt 28 configured to extend over the output and input pulleys 27 and 35 and transmit the rotation of the input pulley 35 to the output pulley 27;

the electric motor 40 configured to rotationally drive the input pulley 35 to rotationally drive the nut 20 through the belt 28 and the output pulley 27, and impart a steering force to the wheel turning shaft 10 by the rotation of the nut 20 being converted into axial motion of the wheel turning shaft 10;

the circulation member 23 configured to connect first and second ends of the ball circulation groove 12 so that the plurality of balls 22 may circulate from the first end of the ball circulation groove 12 to the second end or from the second to the first end; and the communicating hole 41 configured to be formed in the wheel turning shaft 10 and formed of the first chamber-side opening portion 41g that opens in the first chamber 30a in the wheel turning shaft 10, the second chamber-side opening portion 41f that opens in the second chamber 30b, and the connecting hole 41e connecting the first chamber-side opening portion 41g with the second chamber-side opening portion 41f, the communicating hole 41 for allowing communication between the first chamber 30a and the second chamber 30b, where space between the housing 30 and the wheel turning shaft 10 is divided into two, and the first chamber 30a is a space located on one side of the bearing 24 and the plurality of balls 22 on the first reference axis L1, while the second chamber 30b is a space located on the other side.

This eliminates the need for the communicating hole to be formed in the housing 30 and thus suppresses a deterioration in strength of the housing 30. Even if a communicating hole is formed in the housing 30, the housing 30 is suppressed from being deteriorated in strength because it is possible to reduce a sectional area of the communicating hole formed in the housing 30.

[Other Embodiments]

The present invention has been described on the basis of the Embodiments 1 to 9. The specific structure of the invention is not limited to the Embodiments 1 to 9. Design modifications without deviating from the gist of the invention are included in the present invention.

For example, the communicating hole 41 may be formed in the housing 30, unlike the Embodiments 1 to 9 in which the communicating hole 41 is not formed in the housing 30. If not only the housing 30 but also another member is provided with the communicating hole 41, the communicating hole 41 to be formed in the housing 30 can be reduced in number and sectional area. This suppresses a deterioration in strength of the housing 30. In this case, since the communicating hole 41 is formed also in the housing 30, the communicating hole 41 to be formed in the other member can be reduced in number and sectional area. This suppresses a deterioration in strength of the other member.

In the Embodiments 1 to 9, the belt 28 is used as a transmission member for transmitting the rotation of the input pulley 35 to the output pulley 27. Instead of the belt 28, a chain may be utilized.

The communicating hole 41 is not limited to one or two in number, and may be formed in large numbers.

The invention may be configured according to an embodiment described below.

(1) A power steering system may comprise:

a wheel turning shaft (rack) configured to move in an axial direction along with rotation of a steering wheel to turn a steered wheel;

a housing configured to include a wheel turning shaft containing portion in which the wheel turning shaft is contained to be movable in the axial direction, and a decelerator containing portion which is disposed in an axially middle portion of the wheel turning shaft containing portion and formed to surround the wheel turning shaft;

a wheel turning shaft-side ball screw groove configured to be disposed in an outer periphery of the wheel turning shaft and formed into a spiral groove;

a nut configured to be disposed inside the decelerator containing portion, the nut including a main body formed into a ring to surround the wheel turning shaft;

a bearing configured to be disposed between an inner wall of the decelerator containing portion and the nut in a radial direction, where a rotation axis of the nut is a central axis, and the radial direction is a radiation direction relative to the central axis, the bearing being formed to surround the nut and rotatably supporting the nut relative to the housing;

a nut-side ball screw groove configured to be formed in an inner periphery of the nut, the nut-side ball screw groove being formed into a spiral groove, the nut-side ball screw groove forming a ball circulation groove together with the wheel turning shaft-side ball screw groove;

a plurality of balls configured to be disposed in the ball circulation groove;

an output pulley configured to be disposed in the nut and formed into a cylinder;

an input pulley configured to be so disposed that a second reference axis which is a rotation axis is radially offset relative to a first reference axis which is the rotation axis of the nut, the input pulley being formed into a cylinder;

a transmission member (belt, chain or the like) configured to extend over the output and input pulleys and transmit rotation of the input pulley to the output pulley;

an electric motor configured to rotationally drive the input pulley to rotationally drive the nut through the transmission member and the output pulley, and to impart a steering force to the wheel turning shaft by the rotation of the nut being converted into axial motion of the wheel turning shaft;

a circulation member (tube) configured to connect first and second ends of the ball circulation groove so that the plurality of balls circulate from the first end of the ball circulation groove to the second end or from the second to the first end; and a communicating hole configured to be disposed in a portion of the nut, avoiding a region in which the plurality of balls circulate in the nut-side screw groove, or in a member disposed radially outside than the nut and radially inside than the inner wall of the decelerator containing portion, the communicating hole allowing communication between a first chamber and a second chamber, in a case where space between the housing and the wheel turning shaft is divided into the first chamber and the second chamber, the first chamber being a space located on one side of the bearing and the plurality of balls on the first reference axis, the second chamber being a space located on the other side.

The above-described power steering system does not require forming the communicating hole allowing communication between the first and second chambers in the housing only, and therefore suppresses a deterioration in strength of the housing. In addition to the above communicating hole, another communicating hole may be formed in the housing.

(2) In the power steering system described in (1), the communicating hole may be disposed in a portion of the nut, avoiding the region in which the plurality of balls circulate in the nut-side ball screw groove.

According to the above-described power steering system, if a communicating hole is formed in the bearing or the like, effects on an axle-supporting performance of the bearing have to be considered. If the communicating hole is formed in the nut, however, there is no need for such consideration.

(3) In the power steering system described in (2), the communicating hole may be formed to allow communication between the inner periphery side of the nut and the outer periphery side of the nut, the nut being shaped like a ring.

The above-described power steering system allows the nut to be downsized in radial dimension, as compared to a case in which an axial through-hole is formed in the nut.

(4) In the power steering system described in (3), the nut may include a pair of ball circulation holes, each having a first end which opens in the nut-side ball screw groove and a second end which opens in the outer periphery of the nut;

the circulation member may be so disposed as to connect the pair of ball circulation holes to each other; and the communicating hole may be formed to be continuous with the ball circulation hole located closer to the bearing than the other one of the pair of ball circulation holes.

The above-described power steering system makes it possible to form the communicating hole by enlarging the ball circulation holes without separately forming a communicating hole.

(5) In the power steering system described in (4), the communicating hole may be formed to be continuous with the ball circulation hole located closer to the bearing and formed on the bearing side in the direction of the first reference axis.

The above-described power steering system can suppress the communicating hole from interfering with the region in which the balls circulate.

(6) In the power steering system described in (3), the nut may include a pair of ball circulation holes, each having a first end which opens in the nut-side ball screw groove and a second end which opens in the outer periphery of the nut;

the circulation member may be so disposed as to connect the pair of ball circulation holes to each other; and the communicating hole may be disposed in a portion of the nut to be located on a circumferentially opposite side from the circulation member, where the circumferential direction is a direction around the first reference axis.

The above-described power steering system can prevent the communicating hole from interfering with the circulation member.

(7) In the power steering system described in (3), a plurality of communicating hole may be provided in a circumferential direction of the nut, where the circumferential direction is a direction around the first reference axis.

According to the above-described power steering system, if one of the communicating holes is blocked with grease or the like in the ball circulation groove, another communicating hole can secure connection between the first and second chambers.

(8) In the power steering system described in (3), the bearing may comprises a seal bearing, the seal bearing including an inner race, an outer race, a plurality of balls disposed between the inner and outer races, and a seal member for sealing a gap between the inner and outer races; and the communicating hole may be provided in such a position as not to overlap the seal member in the direction of the first reference axis.

The above-described power steering system can prevent the problem that the communicating hole inhibits the seal member from exerting a sealing performance or is blocked by the seal member.

(9) In the power steering system described in (3), the communicating hole may be formed to be inclined with respect to the radial direction by being so formed such that an opening portion located in the inner periphery of the nut is disposed closer to the bearing in the direction of the first reference axis than an opening portion located in the outer periphery of the nut.

According to the above-described power steering system, the inner periphery-side opening portion of the communicating hole needs to be formed in such a position as not to interfere with the nut-side ball circulation groove, and the outer periphery-side opening portion in such a position as not to interfere with the bearing. On the other hand, the communicating hole formed at an angle can downsizes the nut in axial dimension and suppresses the above-mentioned interference at the same time.

(10) In the power steering system described in (9), one of the pair of opening portions of the communicating hole, which is located in the outer periphery of the nut, may be disposed to overlap the region in which the plurality of balls circulate, in the direction of the first reference axis.

According to the above-described power steering system, the region in which the plurality of balls circulate and the outer periphery-side opening portion of the communicating hole, which are two different functional parts, overlap each other in the axial direction of the nut. This can downsizes the nut in axial dimension.

(11) In the power steering system described in (3), the power steering system may further comprise a wall protruding from the inner wall of the decelerator containing portion in the radially inward direction the wall being disposed between one of the pair of opening portions of the communicating hole, which is located on the outer periphery of the nut and the transmission member in the direction of the first reference axis.

According to the power steering system, the wall can suppresses grease or the like leaking through the communicating hole from spattering toward the transmission member.

(12) In the power steering system described in (2), the communicating hole may be formed to connect both first reference axial ends of the nut and extend in the direction of the first reference axis.

The above-described power steering system can downsize the nut in axial dimension.

(13) The power steering system described in (1) may further comprise a ring-shaped spacer disposed between the radially outer periphery of the bearing and the decelerator containing portion or between the radially inner side of the bearing and the nut, and the communicating hole may be disposed in the spacer.

The above-described power steering system does not require consideration for effects of the communicating hole on the nut and the bearing.

(14) In the power steering system described in (13), the communicating hole may be a spiral groove disposed in the inner or outer periphery of the ring-shaped spacer.

The above-described power steering system can circumferentially disperse the effects of the communicating hole disposed in the spacer, as compared to a case in which the communicating hole is formed linearly in the axial direction.

(15) In the power steering system described in (1), the communicating hole may be formed in the bearing.

The above-described power steering system does not require consideration for effects of the communicating hole on the nut.

(16) A power steering system may comprise:

a wheel turning shaft (rack) configured to move in an axial direction along with rotation of a steering wheel to turn a steered wheel;

a housing configured to include a wheel turning shaft containing portion in which the wheel turning shaft is contained to be movable in the axial direction, and a decelerator containing portion which is disposed in an axially middle portion of the wheel turning shaft containing portion and which is formed to surround the wheel turning shaft;

a wheel turning shaft-side ball screw groove configured to be disposed in an outer periphery of the wheel turning shaft and to be formed into a spiral groove;

a nut configured to be disposed inside the decelerator containing portion, and the nut including a main body formed into a ring to surround the wheel turning shaft;

a bearing configured to be disposed between an inner wall of the decelerator containing portion and the nut in a radial direction, where a rotation axis of the nut is a central axis, and the radial direction is a radiation direction relative to the central axis, the bearing being formed to surround the nut and rotatably supporting the nut relative to the housing;

a nut-side ball screw groove configured to be formed in an inner periphery of the nut, the nut-side ball screw groove being formed into a spiral groove, nut-side ball screw groove forming a ball circulation groove together with the wheel turning shaft-side ball screw groove;

a plurality of balls configured to be disposed in the ball circulation groove;

an output pulley configured to be disposed in the nut and formed into a cylinder;

an input pulley configured to be disposed such that a second reference axis which is a rotation axis is radially offset relative to a first reference axis which is the rotation axis of the nut, the input pulley being formed into a cylinder;

a transmission member (belt, chain or the like) configured to extend over the output and input pulleys and transmit rotation of the input pulley to the output pulley;

an electric motor configured to rotationally drive the input pulley to rotationally drive the nut through the transmission member and the output pulley, and impart a steering force to the wheel turning shaft by the rotation of the nut being converted into axial motion of the wheel turning shaft;

a circulation member (tube) configured to connect first and second ends of the ball circulation groove so that the plurality of balls circulate from the first end of the ball circulation groove to the second end or from the second to the first end; and a communicating hole configured to be disposed in the wheel turning shaft, the communicating hole comprising a first chamber-side opening portion that opens in a first chamber in the wheel turning shaft, a second chamber-side opening portion that opens in a second chamber, and a connecting hole connecting the first chamber-side opening portion with the second chamber-side opening portion, the communicating hole allowing communication between the first chamber and the second chamber, in a case where space between the housing and the wheel turning shaft is divided into the first chamber and the second chamber, the first chamber being a space located on one side of the bearing and the plurality of balls on the first reference axis, the second chamber being a space located on the other side.

The above-described power steering system does not require forming the communicating hole allowing communication between the first and second chambers in the housing only, and therefore can suppress a deterioration in strength of the housing. In addition to the above communicating hole, another communicating hole may be formed in the housing.

The foregoing descriptions are related only to several embodiments of the invention. It should be easily understandable by a person skilled in the art that the embodiments illustrated above may be modified or improved in various ways without substantial deviation from the new teachings and advantages of the invention. It is therefore intended that any embodiments added with such modification or improvement are included in the technical scope of the invention.

The present application claims priority under Japanese Patent Application No. 2013-178903 filed on Aug. 30, 2013. The entire disclosure of Japanese Patent Application No. 2013-178903 filed on Aug. 30, 2013, including the description, claims, drawings and abstract, is incorporated herein by reference in its entirety.

REFERENCE SIGNS LIST

10 wheel turning shaft, 11 wheel turning shaft-side ball screw groove, 12 ball circulation groove, 20 nut, 20*a* main body, 20*b* internal thread portion, 20*e* ball circulation groove second end side opening, 20*f* ball circulation groove first end side opening, 20*g* engaging groove, 21 nut-side ball screw groove, 22 ball, 23 circulation member, 24 bearing, 24*a* outer race, 24*c* inner race, 24*d* ball, 24*e* seal member, 27 output pulley, 28 belt (transmission member), 30 housing, 31 wheel turning shaft containing portion, 32 decelerator containing portion, 35 input pulley, 40 electric motor, 41 communicating hole, 85 spacer

The invention claimed is:

1. A power steering system comprising:

a wheel turning shaft configured to move in an axial direction along with a rotation of a steering wheel to turn a steered wheel;

a housing configured to include a wheel turning shaft containing portion in which the wheel turning shaft is contained to be movable in the axial direction, and a decelerator containing portion which is disposed in an axially middle portion of the wheel turning shaft containing portion and formed to surround the wheel turning shaft;

a wheel turning shaft-side ball screw groove configured to be disposed in an outer periphery of the wheel turning shaft and formed into a spiral groove;

a nut configured to be disposed inside the decelerator containing portion, the nut including a main body formed into a ring to surround the wheel turning shaft;

a bearing configured to be disposed between an inner wall of the decelerator containing portion and the nut in a radial direction, where a rotation axis of the nut is a central axis, and the radial direction is a radiation direction relative to the central axis, the bearing being formed to surround the nut and rotatably supporting the nut relative to the housing;

a nut-side ball screw groove configured to be formed in an inner periphery of the nut, the nut-side ball screw groove being formed into a spiral groove, the nut-side ball screw groove forming a ball circulation groove together with the wheel turning shaft-side ball screw groove;

a plurality of balls configured to be disposed in the ball circulation groove;

an output pulley configured to be disposed in the nut and formed into a cylinder;

an input pulley configured to be so disposed that a second reference axis which is a rotation axis is radially offset relative to a first reference axis which is the rotation axis of the nut, the input pulley being formed into a cylinder;

a transmission member configured to extend over the output and input pulleys and transmit a rotation of the input pulley to the output pulley;

an electric motor configured to rotationally drive the input pulley to rotationally drive the nut through the transmission member and the output pulley, and to impart a steering force to the wheel turning shaft by the rotation of the nut being converted into axial motion of the wheel turning shaft;

a circulation member configured to connect first and second ends of the ball circulation groove so that the plurality of balls circulate from the first end of the ball circulation groove to the second end or from the second end to the first end; and at least one communicating hole disposed in a portion of the nut, avoiding a region in which the plurality of balls circulate in the nut-side screw groove, in a case where a space between the housing and the wheel turning shaft is divided into a first chamber and a second chamber, the first chamber being a space located on one side of the bearing and the plurality of balls on the first reference axis, the second chamber being a space located on the other side of the bearing and the plurality of balls on the first reference axis.

2. The power steering system of claim 1, wherein the at least one communicating hole is formed to allow communication between the inner periphery side of the nut and the outer periphery side of the nut, the nut being a ring shape.

3. The power steering system of claim 2, wherein the nut includes a pair of ball circulation holes, each having a first end which opens in the nut-side ball screw groove and a second end which opens in the outer periphery of the nut;

the circulation member is so disposed as to connect the pair of ball circulation holes to each other; and the at least one communicating hole is formed to be continuous with the ball circulation hole located closer to the bearing than the other one of the pair of ball circulation holes.

4. The power steering system of claim 3, wherein the at least one communicating hole is formed to be continuous with the ball circulation hole located closer to the bearing and formed on the one bearing side in a direction of the first reference axis.

5. The power steering system of claim 2, wherein the nut includes a pair of ball circulation holes, each having a first end which opens in the nut-side ball screw groove and a second end which opens in the outer periphery of the nut;

the circulation member is so disposed as to connect the pair of ball circulation holes to each other; and the at least one communicating hole is disposed in a portion of the nut to be located on a circumferentially opposite side from the circulation member, where the circumferential direction is a direction around the first reference axis.

6. The power steering system of claim 2, wherein the at least one communicating hole further includes a plurality of communicating holes provided in a circumferential direction of the nut, where the circumferential direction is a direction around the first reference axis.

7. The power steering system of claim 2, wherein the bearing comprises a seal bearing, the seal bearing including an inner race, an outer race, a plurality of balls disposed between the inner and outer races, and a seal member for sealing a gap between the inner and outer races; and the at least one communicating hole is provided in such a position as not to overlap the seal member in a direction of the first reference axis.

8. The power steering system of claim 2, wherein the at least one communicating hole is formed to be inclined with respect to the radial direction by being so formed such that an opening portion located in the inner periphery of the nut is disposed closer to the bearing in a direction of the first reference axis than an opening portion located in the outer periphery of the nut.

9. The power steering system of claim 8, wherein one of the pair of opening portions of the at least one communicating hole, which is located in the outer periphery of the nut, is disposed to overlap the region in which the plurality of balls circulate, in a direction of the first reference axis.

10. The power steering system of claim 2, further comprising a wall protruding from the inner wall of the decelerator containing portion in the radially inward direction, the wall being disposed between one of the pair of opening portions of the at least one communicating hole, which is located on the outer periphery of the nut and the transmission member in a direction of the first reference axis.

11. The power steering system of claim 1, wherein the at least one communicating hole is formed to connect both first reference axial ends of the nut and extend in a direction of the first reference axis.

12. The power steering system of claim 1, further comprising a ring-shaped spacer disposed between a radially outer periphery of the bearing and the decelerator containing portion or between a radially inner side of the bearing and the nut, wherein the at least one communicating hole is disposed in the spacer.

13. The power steering system of claim 12, wherein the at least one communicating hole is a spiral groove disposed in the inner or outer periphery of the ring-shaped spacer.

14. A power steering system comprising:

a space disposed between a housing and a wheel turning shaft, wherein the space includes:

a first chamber located on one axial side of a bearing supporting a nut that surrounds the wheel turning shaft and a plurality of balls disposed in the nut; and a second chamber located on another axial side of the bearing supporting the nut and the plurality of balls disposed in the nut, wherein
at least one communicating hole is formed in a portion of the nut, avoiding a region in which the plurality of balls circulate in a nut-side screw groove, the at least one communicating hole allowing communication between the first chamber and the second chamber.

* * * * *